United States Patent
Trevathan et al.

(10) Patent No.: US 12,175,548 B2
(45) Date of Patent: Dec. 24, 2024

(54) MOBILE APPLICATION LICENSING TOOL

(71) Applicant: Kony Inc., Orlando, FL (US)

(72) Inventors: Matthew B. Trevathan, Roswell, GA (US); Matthew A. Terry, Celebration, FL (US); Bjorn Hildahl, Orlando, FL (US)

(73) Assignee: KONY, INC., Orlando, FL (US)

( * ) Notice: Subject to any disclaimer, the term of this patent is extended or adjusted under 35 U.S.C. 154(b) by 743 days.

(21) Appl. No.: 15/170,377

(22) Filed: Jun. 1, 2016

(65) Prior Publication Data

US 2017/0352115 A1 Dec. 7, 2017

(51) Int. Cl.
*G06Q 20/18* (2012.01)
*G06Q 50/18* (2012.01)

(52) U.S. Cl.
CPC ....... *G06Q 50/184* (2013.01); *G06Q 2220/18* (2013.01)

(58) Field of Classification Search
CPC .............. G06Q 50/184; G06Q 2220/18
See application file for complete search history.

(56) References Cited

U.S. PATENT DOCUMENTS

| | | | | |
|---|---|---|---|---|
| 5,708,709 A * | 1/1998 | Rose | ............ | G06F 8/61 380/30 |
| 5,845,065 A * | 12/1998 | Conte | ............ | G06F 21/105 726/31 |
| 6,044,469 A * | 3/2000 | Horstmann | ............ | G06Q 99/00 705/51 |
| 9,842,199 B2 * | 12/2017 | Ito | ............ | G06F 21/105 |
| 9,846,899 B1 * | 12/2017 | Stickle | ............ | G06Q 30/06 |
| 2001/0039598 A1 * | 11/2001 | Moon | ............ | G06F 9/45512 719/328 |
| 2002/0107750 A1 * | 8/2002 | Kanevsky | ............ | G06Q 30/02 705/51 |
| 2002/0107809 A1 * | 8/2002 | Biddle | ............ | G06Q 30/06 705/59 |
| 2002/0108049 A1 * | 8/2002 | Xu | ............ | G06F 21/10 713/193 |

(Continued)

FOREIGN PATENT DOCUMENTS

EP 2390813 A2 * 11/2011 ............. G06F 21/10

OTHER PUBLICATIONS

Software Licensing Models: What's Out There?, Ferrante, IT professional, Nov. 2006, vol. 8 (6), p. 24-29, Article 24.*

*Primary Examiner* — Ilse I Immanuel
(74) *Attorney, Agent, or Firm* — Andrew Calderon; Calderon Safran & Wright P.C.

(57) ABSTRACT

The disclosure relates to mobile applications and, more particularly, to systems and processes for providing a licensing framework in mobile applications developed in a web-based integrated development environment (IDE). The method includes: providing a licensing framework for a computer application residing on a computing device, the computer application being configured to access services through one or more backend services; receiving call ups from the computing device to determine whether usage of the computer application complies with the licensing framework; and providing enforcement mechanisms which affect at least one of services and functionality associated with the computer application based on a state of compliance with the licensing framework.

19 Claims, 4 Drawing Sheets

(56) References Cited

U.S. PATENT DOCUMENTS

| | | | |
|---|---|---|---|
| 2002/0164025 A1* | 11/2002 | Raiz | G06F 21/10 380/231 |
| 2004/0083180 A1* | 4/2004 | Braun | H04Q 3/0025 705/59 |
| 2004/0193545 A1* | 9/2004 | Shlasky | G06F 21/125 705/59 |
| 2005/0010531 A1* | 1/2005 | Kushalnagar | G06Q 50/184 705/59 |
| 2007/0100762 A1* | 5/2007 | Luo | G06F 21/105 705/59 |
| 2007/0198429 A1* | 8/2007 | Coley | H04L 9/0838 705/59 |
| 2007/0294209 A1* | 12/2007 | Strub | H04L 63/102 |
| 2007/0300212 A1* | 12/2007 | Kersters | G06F 8/427 717/150 |
| 2008/0086423 A1* | 4/2008 | Waites | G06F 21/10 705/59 |
| 2009/0006109 A1* | 1/2009 | Martinez | G06Q 50/184 705/310 |
| 2009/0290716 A1* | 11/2009 | O'Connor | G06F 21/10 380/278 |
| 2009/0319679 A1* | 12/2009 | Okada | H04L 67/06 709/230 |
| 2010/0325734 A1* | 12/2010 | Etchegoyen | G06F 21/121 726/26 |
| 2011/0138445 A1* | 6/2011 | Chasen | H04L 63/10 726/3 |
| 2011/0191593 A1* | 8/2011 | Cheng | G06F 21/121 713/189 |
| 2014/0205265 A1* | 7/2014 | Schoenwald | H04N 21/8583 386/241 |
| 2014/0230068 A1* | 8/2014 | Kundapur | G06F 21/125 726/26 |
| 2016/0266889 A1 | 9/2016 | Gross et al. | |
| 2016/0267649 A1* | 9/2016 | Hu | G06F 19/321 |
| 2017/0061105 A1* | 3/2017 | Minagawa | G06F 21/105 |
| 2019/0182222 A1* | 6/2019 | Sammet | H04L 9/3234 |

* cited by examiner

MOBILE APPLICATION LICENSING TOOL

FIELD OF THE INVENTION

The invention relates to mobile applications and, more particularly, to systems and processes for providing a licensing framework in mobile applications developed in a web-based integrated development environment (IDE).

BACKGROUND OF THE INVENTION

Mobile applications (applications) are generally classified as one of native, web, and hybrid. A native application is written in a native programming language for a specific mobile device platform and is executable only on the particular operating system (e.g., iOS, Android, Windows, etc.) associated with the platform. A native application can access the available Application Programming Interface (APIs) of the particular operating system (OS) and can access the mobile device's native platform features (e.g., camera, compass, GPS, etc.). However, a native application written for one mobile platform cannot be used on another, different mobile platform.

In order to develop applications, a developer requires several tools, e.g., toolsets. These tools can include, e.g., integrated development environment (IDE) tools, provided by different studios. These tools can then be used to develop applications for different applications and operating systems. These tools can be provided by a service provider based on a licensing arrangement or can be free tools which utilize open standards.

SUMMARY OF THE INVENTION

In a first aspect of the invention, a method comprises: providing a licensing framework for a computer application residing on a computing device, the computer application being configured to access services through one or more backend services; receiving call ups from the computing device to determine whether usage of the computer application complies with the licensing framework; and providing enforcement mechanisms which affect at least one of services and functionality associated with the computer application based on a state of compliance with the licensing framework.

In another aspect of the invention, a computer program product comprises non-transitory computer readable storage medium having program instructions embodied therewith. The program instructions are executable by a computing device to cause the computing device to: upon initializing of an application having a licensing file, check for expiration of a license based on information in the licensing file; query for a new license when the license has expired; issue a new license when the license has expired and renew services associated with the application; and update or provide new policies to the application, through an update of the licensing file.

In yet another aspect of the invention, a system comprises: a system comprises: a CPU, a computer readable memory and a computer readable storage medium; program instructions to access a set of development tools; program instructions to build an application using the development tools; program instructions to include a licensing file with the application, the licensing file including a license ID which is mapped to the developer and used to determine a validity of a license; program instructions to compile the application; program instructions to deploy the application to an application store; and program instructions to monitoring of the application usage and/or time and implement an policy enforcement per the licensing file. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF THE INVENTION

The invention relates to mobile applications and, more particularly, to systems and processes for providing a licensing framework in mobile applications developed in a web-based integrated development environment (IDE). In more specific embodiments, the systems and processes described herein provide a licensing framework which can be appended/attached to the application and which can be used to provide a host of enforcement policies. For example and advantageously, the systems and processes provided herein allow a service to impose certain policy restrictions on services or functionality associated with the application (and more specifically, the licensing framework), ranging from disabling or degradation of services to expiry of the services, itself.

In exemplary embodiments, the application can be built by a third party developer and uploaded by an end user through any application store in which the application resides, e.g., an application store hosted by Kony Inc. In embodiments, the application can be built using toolsets provided by a service provider such as Kony Inc. These toolsets can be, e.g., provided by Kony™ Visualizer™, which can be, e.g., open and standards-based tools, used by developers to develop a host of different applications that are used to obtain services, etc. The applications can be, e.g., native, web, or hybrid applications for phones, tablets, desktops, and the Internet of Things.

In example embodiments, the toolsets allow for the creation of rich, web, native, and hybrid applications from a single code base using a cross-platform mobile development toolset; although other applications and toolsets are contemplated herein. In preferred embodiments, the application will be developed with toolsets that can support a multitude of smartphones, feature phones, tablets, etc., and can be built natively for different operating systems including, e.g., Android, iOS, Windows, and Blackberry, while being fully supported by all native browsers. Ideally, the developer would have a license to use the toolsets to develop the application. And, the license framework would be a licensing file which enforces use restrictions of the application.

The application will include a licensing framework which, in operation and use, preferably communicates with both backend services supporting the functionality and services associated with the application and a licensing server enforcing licensing provisions, e.g., hosted by Kony Inc. The host, i.e., backend services, can monitor the usage (session) of the application and enforce policies associated with the licensing framework, by service calls back to the services. In embodiments, the host need not provide any of the backend services, but instead would monitor the licensing provisions during service calls.

The enforcement of the licensing provisions can include varying levels. For example, the levels of response can range from: (i) a simple notification, while allowing the user to continue with the services, (ii) a degradation of performance or services, (iii) complete disabling of services, and/or (iv) providing only log in services, amongst others. These enforcement policies, e.g., locking out certain services to an end user, can be enforced when the developer has failed to pay a license fee to use the development tools or when such license to the developer has expired, or other licensing provisions have been breached. The enforcement policies can be cancelled upon any one of several events including, the developer paying for the development tools, the user paying a fee to use the application, etc.

System Environment

The present invention may be embodied as a system, method or computer program product. The present invention may take the form of a hardware embodiment, a software embodiment or a combination of software and hardware. Furthermore, the present invention may take the form of a computer program product embodied in any tangible storage medium of expression having computer-usable program code embodied in the medium. The computer-usable or computer-readable medium is not a transitory signal per se, and is tangible medium that can contain and store the computer program code for use by or in connection with an instruction execution system, apparatus, or device, implementing the many aspects of the present invention.

Figure 1:
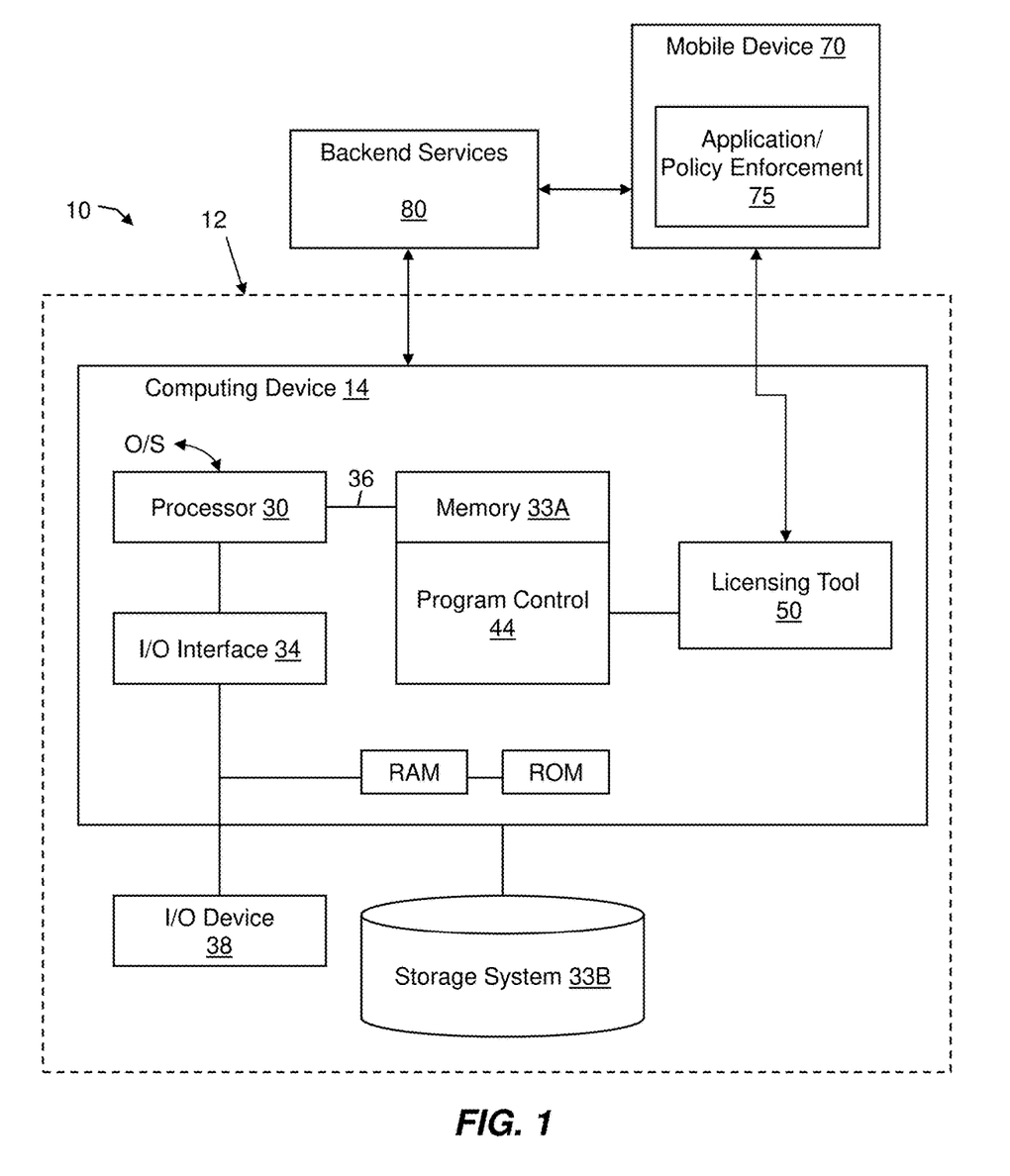
FIG. 1 shows an illustrative environment for managing the processes in accordance with the invention.

FIG. 1 shows an illustrative environment 10 for managing the processes in accordance with the invention. The environment 10 includes a server 12 or other computing system. In embodiments, the server 12 can be a standalone server, which implements the processes of the present invention within a networking environment. That is, the server 12 and/or processes performed by the server 12 can be integrated into a networking environment of any enterprise or provided over the cloud.

In embodiments, the server 12 can provide backend services which support the functionality and services associated with an application 75 provided on one or more mobile device 70. By way of even more specific example, the server 12 can provide: (i) a toolset for a developer to develop one or more applications 75 (which can be, as noted already herein, native, web, or hybrid application for phones, tablets, desktops, and the Internet of Things); (ii) enforcement of licensing policies as implemented within a licensing file appended to the application 75, and/or (iii) backend services associated with the implementation of the functionality and/or services associated with the application 75. In embodiments, though, backend services can be provided by a third party source, as shown by reference numeral 80.

In embodiments, a service provider which hosts the server 12, such as a Solution Integrator (e.g., Kony Inc.), could offer to provide toolsets to the developer for developing the application 75. In this case, the service provider can create, maintain, deploy, support, etc., the computer infrastructure that allows the developer to develop the application and to provide services to the end user, e.g., one or more clients. These clients may be, for example, any business that uses technology. In return, the service provider can receive payment from the developer under a subscription and/or fee agreement. Accordingly, the developer of the application can use the server 12 to develop the application using toolsets provided by the server 12.

In further embodiments, the server 12 can attach or append a licensing file into the application 75, with or without the knowledge of the developer. In embodiments, the licensing file can be compressed or encrypted so that it would be difficult to access by both the developer and the end user, as examples. And, the server 12 can enforce the licensing policies through the use of a licensing tool 50, as the application 75 accesses the server 12 in order to retrieve/obtain services and/or functionality through the backend services 80. In embodiments, the application 75 and, more specifically, the one or more devices 70 can communicate with the server 12 using JSON, which is an open standard format to transmit data objects consisting of attribute—value pairs. In this way, the one or more devices 70 can asynchronous communicate with the server 12.

By way of more specific examples, in embodiments, the server 12 can be a Mobile Backend as a Service (MBaaS), maintained by a service provider, e.g., Kony Inc. As should be understood by those of ordinary skill in the art, the MbaaS is a model for providing web and mobile application developers with a way to link their applications to backend cloud storage and APIs exposed by backend applications, e.g., provided by backend services 80, while providing features such as user management, push notifications, and integration. In embodiments, the server 12 can also be representative of other types of business enterprise servers, accessible via cloud based applications. The server 12 and/or one or more mobile devices 70 will communicate with other backend services as represented by reference numeral 80.

The server 12 includes a computing device 14 which can be resident on a network infrastructure or computing device. The computing device 14 includes a processor 20 (e.g., a CPU), a memory 22A, an I/O interface 24, and a bus 26. The bus 26 provides a communications link between each of the components in the computing device 14. In addition, the computing device 14 includes a random access memory (RAM), a read-only memory (ROM), and an operating system (O/S). The computing device 14 is in communication with the external I/O device/resource 28 and the storage system 22B. The I/O device 28 can comprise any device that enables an individual to interact with the computing device 14 (e.g., user interface) or any device that enables the computing device 14 to communicate with one or more other computing devices (e.g., mobile devices 70 and backend services 80, etc.) using any type of communications link.

The processor 20 executes computer program code (e.g., program control 44), which can be stored in the memory 22A and/or storage system 22B. The computer program code can include computer program instructions that are stored in a computer readable storage medium. The computer readable storage medium comprises, for example, any non-transitory medium per se, such as electronic, magnetic, optical, electromagnetic, infrared, and/or semiconductor system. More specific examples (a non-exhaustive list) of the computer readable storage medium include: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any combination thereof. Accordingly, the computer readable storage medium may be any tangible medium that can contain or store a program for use by or in connection with an instruction execution system, apparatus, or device of the present invention.

In embodiments, the program control 44 controls the licensing tool 50, which comprises a program that is adapted to perform one or more of the processes described herein. The licensing tool 50 can be implemented as one or more program code in the program control 44 stored in memory 22A as separate or combined modules. Additionally, the licensing tool 50 may be implemented as separate dedicated processors or a single or several processors to provide the functions described herein. While executing the computer program code, the processor 20 can read and/or write data to/from memory 22A, storage system 22B, and/or I/O interface 24. In this manner, the program code executes the processes of the invention.

In embodiments, the licensing tool 50 enforces policies that are provided in a licensing framework, comprising a licensing file which is appended or attached to the application 75. In embodiments, the licensing file may be provided within the shell of the application 75, as provided by the developer during the development stage of the application, using the toolsets provided by the server 12. Alternatively or in addition, the licensing file can be provided directly from the server 12, in which case upon access to the server 12, the licensing file can be installed and appended/attached to the application 75 during an initial session or through upload of the application 75 to the mobile device 70, etc. The enforcement and escalation policies can automatically begin at log in, upon making service calls back to the server 12, and can be run in the background. In this way, it is not necessary to wait for backend authentication to begin an enforcement policy.

In any scenario, the licensing file provides different enforcement policies, which can be enforced and escalated by the licensing tool 50, depending on the design parameters and business objectives. For example, the enforcement and escalation policies can run in the background of any services and can include, amongst others, e.g., (i) a simple notification that the license is about to expire, while allowing the user to continue with the services for a predetermined amount of time;
(ii) expiration of the services or functionality associated with the application, within a predetermined time period, at a certain time, after a certain amount of uses, etc.;
(iii) degradation of performance of services or functionality after a predetermined time period or usage;
(iv) disabling selected services or functionality after a predetermined time period or usage;
(v) allow only login functions after a predetermined time period or usage;
(vi) redirecting the application to another URL, perhaps for updates on an application store hosted by a third party or the backend services;
(vii) change the policies of the licensing file; and/or
(viii) escalate the license expiration from simple notification to eventually making the application unusable through various steps of disablement, etc.

In embodiments, the expiration or disabling of services can be provided by setting the server URL in the application 75 to null. The expiration of the application 75, e.g., services and/or functionality, may also provided using a timestamp provided with the licensing file, or implemented by incrementing a counter at each log in or call back to the server 12. By way of more specific embodiments, the licensing framework can include a license ID which may include an expiration date. In this embodiment, the application 75 does not need to call to the server 12 as no updates or enforcement policies associated with the licensing file would be required. Alternatively, the licensing file can execute an escalation process internally, without the need to access the server, upon expiration of the license, e.g., when the expiration has past. On the other hand, when the expiration date has past, the application 75 can call back to the server 12 so that the licensing tool 50 can escalate the enforcement policies.

By way of further examples, the licensing file and/or licensing tool 50 can generate a time check function with a "time bomb" set for the same expiration date and/or time of access to the service or backend services. In embodiments, the "time bomb" would completely disable the application 75 such that login to the backend services would not be possible. Alternatively, the "time bomb" would disable selected or all functionality and/or services except for login such that the end user can be provided with renewal information. Renewal information can be published to the one or more mobile applications 75, and can include updated licensing file (with updated enforcement policies). Also, in implementation, upon expiration of the license, the licensing tool 50 or the server 12, itself, would stop servicing requests and return errors once the license has expired.

In further embodiments, natively rendered applications 75 can be hardcoded with an expiration time that matches the expiration of the services provided by the backend services, e.g., provided by server 12 and/or backend services 80. In this case, an update to the application would not be possible without licensing the backend services and rebuilding the binary. The date and time can be pulled from the local device 70. For mobile web applications, similar logic can be built into the JavaScript. In any scenario, the application 75 would have certain policy enforcements which could not easily be bypassed, and which would be monitored by the licensing tool 50.

In further embodiments, the features of the application 75 can be automatically enabled or disabled by the actual code module that executes the feature being automatically downloaded or deleted when the license logic enables/disables such features. For example, disabling the rights to a certain module of the application 75 can be provided by fully removing the code needed to run that module from the mobile device. If the function is re-enabled, it can then be auto downloaded and installed inside the application container, i.e., a separate application is not required.

The licensing file can include the URL for the server 12, such that regardless of whether the application 75 is using backend services provided by the server 12, the application 75 can always connect to the server 12 in order to determine whether enforcement policies of the licensing framework should be initiated. This allows the server 12 to track the number of sessions and/or session time (e.g., usage of the application based on time constraints). In this way, the server 12 can always send a message to the one or more devices 70 noting that, e.g., an update of the application 75 is necessary, or that an enforcement policy may be initiated.

In embodiments, the application 75 can communicate with the server 12 (e.g., licensing server) on a URL to validate the license. In embodiments, the license policy can include how many times the application can launch and work when it cannot communicate to the server 12. In this implementation, a cached local policy or file residing on the mobile device can be used to inform the mobile device what the last known license was and how long it can operate on that license if it cannot make an update to the server 12. This feature can be used to ensure a customer does not find a way to simply block code from communicating with the server 12, thereby allowing the application to run indefinitely because it cannot contact the server 12 to know the license is invalid.

By way of further explanation and embodiments, sessions in an evaluation scenario, e.g., when a user is evaluating the application 75 and its services/functionality, would be tracked by the server 12 and/or licensing tool 50 by monitoring requests to the server 12. This same procedure can be used for any of the above noted escalations based on session usage, whether the application 75 is being used on an evaluation scenario or it is a full license which may expire at a time certain of after a number of sessions.

Also, in embodiments, if a developer builds an application that does not use the backend server 12 for the initial services, then the licensing file can simply disable the application upon expiration of the license. Alternatively, the licensing file can make service calls back to the server 12 and, more specifically, the licensing tool 50, in order for the server 12 to check whether a policy needs to be enforced. These functions can be monitored through the licensing file, itself, by having a time out session code or time period expiration code, hardcoded into the licensing file or through certain APIs connecting directly to the server 12, even when a service is not provided by the backend services associated with the server 12.

In still further examples and further embodiments, for customers paying for the services associated with the application 75, the license can be renewed without having to rebuild the application, itself. (See, e.g., U.S. application Ser. No. 14/657,153, the contents of which are incorporated by reference in its entirety herein.) In this scenario, the application will make service calls back to the server 12 to check for updates. Updates can then be sent directly to the customer. This can be done through background threads to alleviate any concerns that license calls will cause latency issues. Also, in embodiments, the call backs to the server 12 can check for updates, with the server 12 comprising a multi-tenant versioning system which stores and tracks updates to the base application and which further has the ability to track sessions, unique users and their specific versions of the application 75. The multi-tenant versioning system can be represented by the storage system 22B.

In embodiments, by using the background threads, the application 75 may start working before the code realizes the application needs to expire, but this does not present issues since the server 12 can detect expiry issues and act accordingly as described herein. The mobile device 70 further includes a JS/native SDK, which allows the device to talk to business logic and data objects as should be understood by those of skill in the art. In addition, not only can the server 12 show a notification, but a pointer can be used to point the user to the application store for an update. The pointer to the application store would support optional and mandatory updates, as examples.

In further embodiments, the licensing tool 50 can update, change or otherwise adjust policies within the licensing file, itself. For example, the licensing file 50 can provide the end user of the application the opportunity to install the application 75 with full functionality, in either a trial mode or fully paid up license. This would allow the application 75 to run, e.g., access server 12 and/or backend services 80, for a predetermined amount of days based on different values and criteria.

The licensing file can also include a license ID used to tie the application 75 back to the developer. The license ID can be held in cache, e.g., storage system 22B, with a pointer showing the link between the license ID and the developer.

Figure 2:
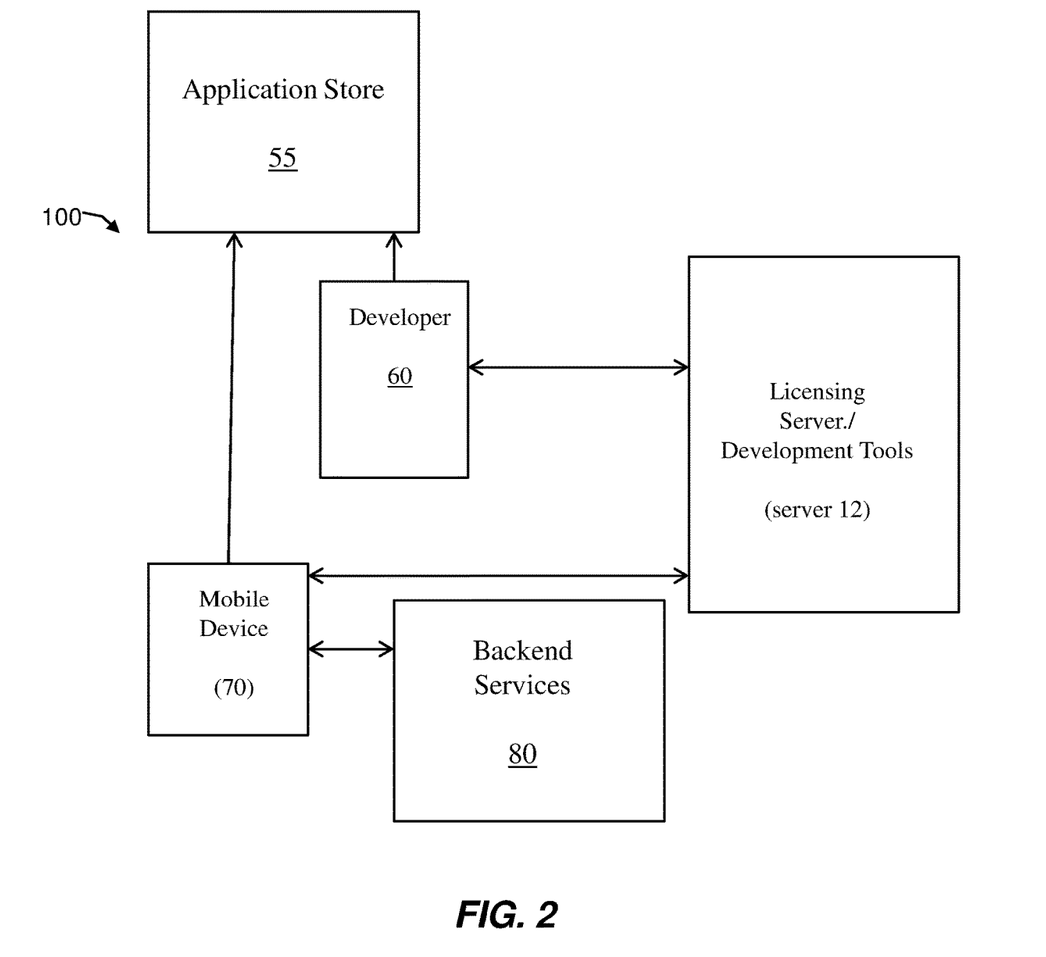
FIG. 2 shows a block diagram of a system environment implemented in accordance with aspects of the invention.

FIG. 2 shows a block diagram of an exemplary system environment implemented in accordance with aspects of the invention. In embodiments, the system environment 100 includes several players/components including: the licensing server 12; the developer 60, the application store 55, the mobile device 60 and the backend services 80 (e.g., server providing backend services). It should be recognized by those of skill in the art that the backend services 80 and the licensing server 12 can be provided by the same service provider and, hence, can be a single component or multiple components. In addition, the application store 55 can be a standalone service provider or can be part of the backend services 80 and the licensing server 12 or any combination thereof, and hence, can be integrated into each or a combination of these components.

As representatively shown in FIG. 2, the developer 60 can obtain a license from the licensing server. The license can be a usage license (e.g., based on number of sessions) or a time based license, e.g., yearly contract, etc., which provides the developer the ability to use different development tools provided by the server 12. In further embodiments, the license can also be based on active unique users over a certain time period (e.g., month or year), named users (e.g., unique) or concurrent users; although other licenses are also contemplated herein such that the present invention is not limited to a particular type of license, e.g., use licenses, site licenses, etc. By way of more specific example, the mobile application can enforce a concurrent or active usage license constraint where the application calls back to the server 12 to see if it is licensed and the server 12 checks to see if there are already too many active users. If so, the server 12 informs the users that all of the current "seats" (e.g., active licenses) are full and limits the performance or features. The background thread can then continue to poll or the server 12 can notify the user when a seat is available and the functionality automatically upgrades to full feature/performance. In this way, the licensing logic on the application will communicate that a user is still active. Also, logic can be included in which the "seat" is automatically released after a certain time period, e.g., 10 minutes, of inactivity.

The application developed by the developer will have a licensing file appended/attached/embedded within the application, e.g., within a shell of the application. In embodiments, the licensing server 12 can provide the licensing file directly into the application developed by the developer. In alternative embodiments, as part of the license agreement, the developer could be required to include the licensing file into the application prior to uploading the application into the application store 55. In further embodiments, code can be written into the application, with or without the knowledge of the developer. That is, the licensing logic can be added to any mobile application even after the application has been compiled, i.e., "app wrapping". In other words, a licensing framework can include licensing logic that can be added after compilation of the application through a wrapping procedure where the licensing logic is injected directly into binary.

As further shown in FIG. 2, the mobile device 70 can access the application store 55 and upload an application. The application can use the backend services 80. Upon initial log on, the application can call back to the licensing server 12, which will check the license ID, determine that the license is valid or invalid, and if the license is invalid or about to expire, notify the developer 60 of the status of the license. The licensing server 12 can also provide a notification of the license status to the mobile device 70. If the license is not valid, enforcement policies can be executed directly from the licensing server 12 or through the application, itself, depending on the configuration of the licensing file.

In embodiments, the enforcement policies can be executed from any combination of the application, itself, and the licensing server 12, and can be escalated based on different factors. For example, cancelation of services can occur if the license is not renewed after a predetermined time after notification or within a set number of sessions (e.g., 100, etc.) after initial notification.

Swim Lane Diagram/Flowchart

Figure 3:
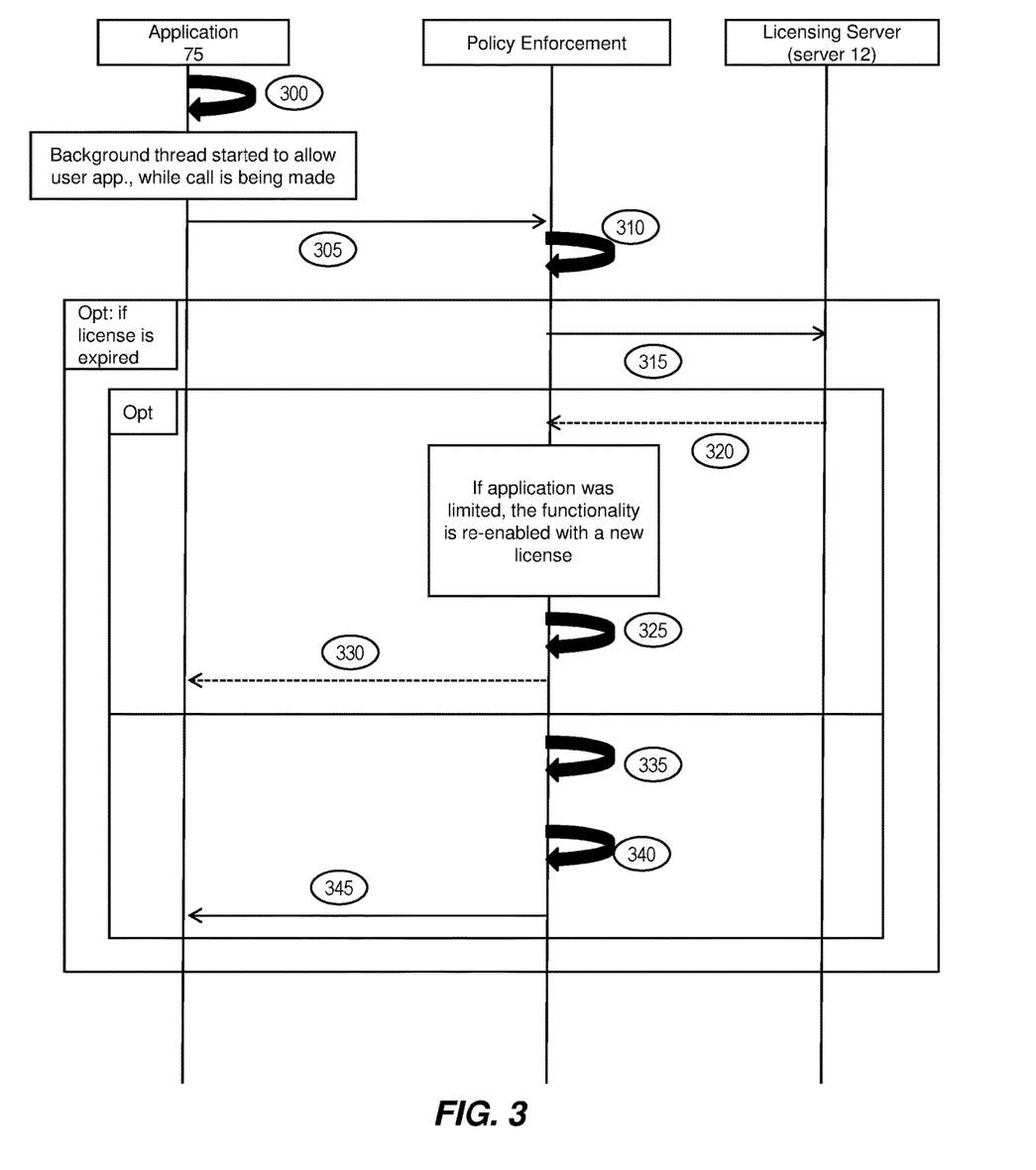
FIG. 3 shows a swim lane diagram implementing processes in accordance with aspects of the invention.
Figure 4:
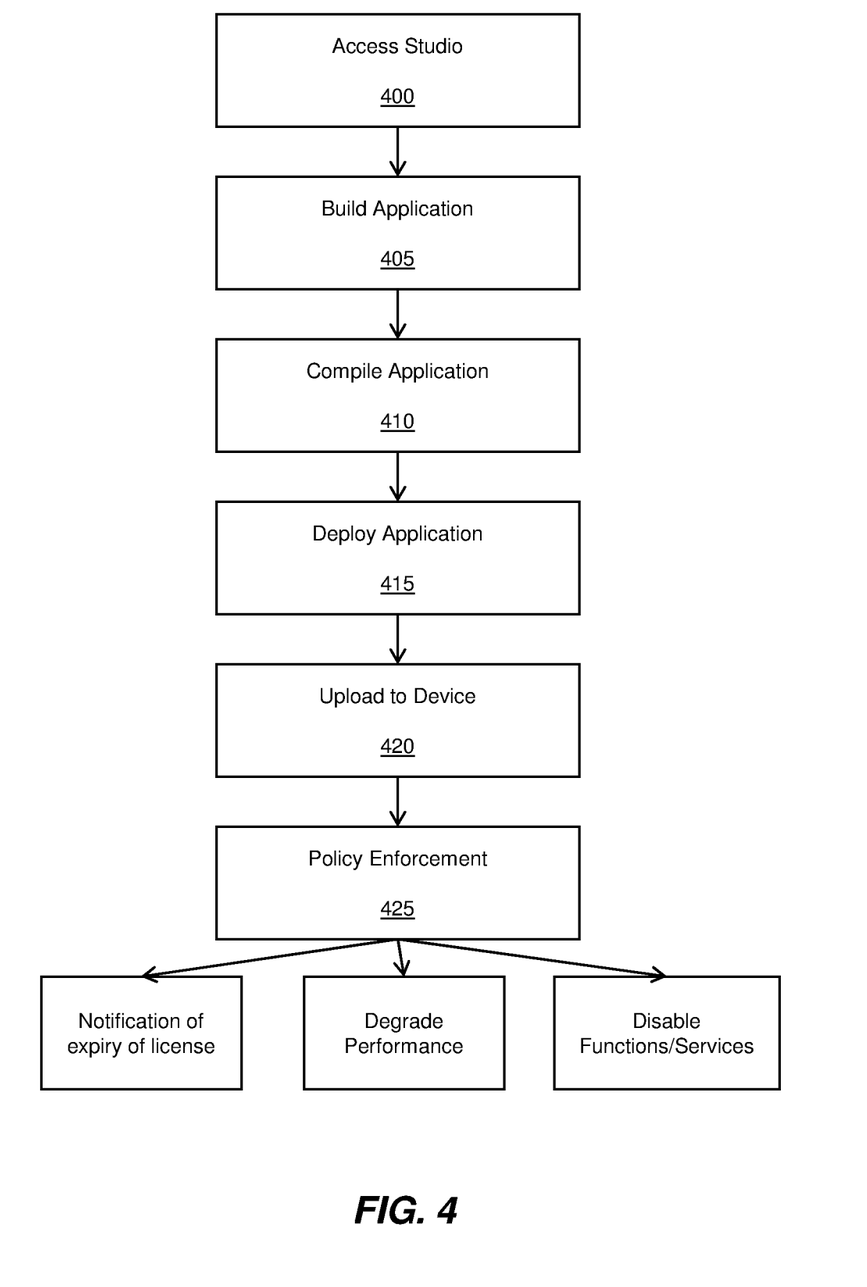
FIG. 4 shows a flowchart implementing processes in accordance with aspects of the invention.

FIGS. 3 and 4 show a swim lane diagram (e.g., sequence diagrams or flow diagrams) and flowchart implementing aspects of the present invention. The swim lane diagram and flowchart may equally represent a high-level block diagram of the invention. The steps of the swim lane diagram and flowchart may be implemented and executed, for example, from either a server, in a client-server relationship, or they may run on a user workstation with operative information conveyed to the user workstation as representatively shown in the environment of FIGS. 1 and 2. Furthermore, steps of the processes of the invention may be implemented using a computer-readable storage medium having program code for use by or in connection with a computer or any instruction execution system. The software and/or computer program product can be implemented in the environments of FIGS. 1 and 2.

More specifically, FIG. 3 shows enforcement of licensing provisions in accordance with aspects of the present invention. In the example of FIG. 3, the following components/players are used in the implementation of processes of FIG. 3: Application 75, policy enforcement and licensing server, e.g., server 12. In embodiments, the policy enforcement can be built into the application, e.g., in the application shell, or can be resident on the licensing server. Moreover, the present invention contemplates that the policy enforcement, if provided in the application shell, can have overriding capabilities, e.g., can take priority over the enforcement by the licensing server; although, it is also contemplated that the licensing server can provide updates to the policy enforcement (e.g., licensing file) such that other priorities are contemplated by the present invention.

In embodiments, the licensing server can be integrated with or separate from the backend services which can be any service provider of services (e.g., requested services), purchased by the end user. Also, the licensing server can be integrated with the server of the development tools, which would provide the developer with a license to use the development tools. In this latter scenario, the licensing server can determine whether the developer has a paid up license for the development tools and, if not, the licensing server can (i) notify the developer that the license has or is about to expire, (ii) request renewal of the license and attend to such renewal, (iii) notify an end user of the status of the license, and/or (iv) if the license is not valid, provide enforcement policies through, for example, escalation processes described herein.

Referring to FIG. 3, at step 300, the end user will initialize the application. In embodiments, at sign on, a background thread allows the user to begin use of the application, while the call is being made to the licensing server. In this way, even when the requested services are not provided through a third party server, the licensing server will always be aware of the status of the license. Accordingly, the licensing server is able to constantly monitor the license and, hence, enable enforcement policies as needed.

At step 305, the policy enforcement will check for the license, and at step 310, the policy enforcement can check the licensing date of the license. These steps can be accomplished through the use of the license ID as described herein. At step 310, the policy enforcement can also check other licensing information including, e.g., tracking of sessions, developer information, etc. At step 315, if the license has expired, the policy enforcement can query the licensing server for a new license.

At step 320, if the license expired, a new license can be returned to the policy enforcement. In embodiments, the new license can be returned upon payment of a license fee, for example. If the application was impaired in some manner due to licensing issues, e.g., disabled, reduced performance of services, etc., the services and/or functionality can be re-enabled with the new license.

At step 325, the policy enforcement can reset the policy. In this step, all previous policies can be cleared and updated, or new policies can be provided to the application. At step 330, the updated or new policies are provided to the application, e.g., through an update of the licensing file. The new or updated policy can thus be pushed to the application from the licensing server, regardless of the other services being provided through the application. The new policy can be, for example, time based or session based, as examples, and can be any of the policies described herein.

If the license has expired and/or there is no response from either the developer or the end user, at step 335, the policy counter can be incremented and, at step 340, certain enforcement policies can be enabled. At step 345, if the license expires and after a certain amount of time has elapsed or a certain number of sessions has been exceeded, the enabled policy enforcement can disable functions and/or services associated with the application. In this way, the services described herein can determine whether a license is valid and enforce the license through an escalation of events, or a single event which would disable the application, as examples. It should be understood that the enforcement of the policies can be enabled by the application itself, e.g., through the licensing file, or pushed to the device by the licensing server. So, for example, the application itself can enforce the policies when policy enforcement is in the application shell.

FIG. 4 shows a flowchart in accordance with aspects of the present invention. In embodiments, the flowchart shows development, deployment and implementation of enforcement policies in accordance with aspects of the invention. More specifically, at step 400, a developer accesses a set of development tools. At step 405, the developer builds an application using the development tools. In embodiments, as already described herein, the application will include a licensing file. The licensing file can include a license ID which can be mapped to the developer and can be used to determine the validity of the license and enforcement policies. At step 410, the developer compiles the application. At step 415, the developer deploys the application to an application store. At step 420, the application can be retrieved from the application store and uploaded onto a client device. At step 425, policy enforcement can begin, which would include the monitoring of the application usage and/or time, per the licensing file framework. In embodiments, the policy enforcement can include an escalation of events upon the expiration of the license, including a simple notification, disabling of functions and services, and degrading of performance characteristics of the application.

The foregoing examples have been provided for the purpose of explanation and should not be construed as limiting the present invention. While the present invention has been described with reference to an exemplary embodiment, changes may be made, within the purview of the appended claims, without departing from the scope and spirit of the present invention in its aspects. Also, although the present invention has been described herein with reference to particular materials and embodiments, the present invention is not intended to be limited to the particulars disclosed herein; rather, the present invention extends to all functionally equivalent structures, methods and uses, such as are within the scope of the appended claims.

What is claimed is:

1. A method, comprising: receiving calls at a licensing server from a computing device having a computer application, including a licensing file related to a license provided by the licensing server, to determine whether usage of the computer application complies with licensing enforcement policies in the licensing file;
   injecting, by the licensing server, licensing logic of the licensing file into binary code of the computer application through a wrapping procedure after compilation of the computer application;
   compressing the licensing file by the licensing server to prevent access to the licensing file;
   enforcing the license enforcement policies by the licensing server, which affect at least one of services and functionality associated with the computer application, including access to backend services, based on a state of compliance of the computer application with the licensing enforcement policies in the licensing file, wherein the enforcing is performed in an escalating manner following a predetermined number of operational sessions of the computer application, after initial notification by the licensing server to a user of the computer application that the license is about to expire, and wherein the escalation includes at least one step, following the initial notification, of degrading performance of, or disabling, at least one of the services and functionality associated with computer application, without making the computer application unusable to the user of the computer application, prior to complete disabling of the services and functionality associated with the computer application following the at least one step;
   generating, by the licensing server, a time check function with a "time bomb" set for a same expiration date and/or time of access to the services;
   automatically disabling, by the licensing server, predetermined functionality associated with the computer application by automatically removing code needed to run the predetermined functionality associated with the computer application and publishing renewal application which includes an updated license file and updated enforcement policies to the computer application in response to the time bomb reaching the same expiration date and/or time of access to the services;
   in response to automatically disabling, allowing, by the licensing server, only login functions after an expiration of the license and after an initial predetermined period of time;
   preventing servicing requests, by the licensing server, to the computer application occurs in response to the license expiring;
   redirecting, by the licensing server, the computer application to another URL for updates on an application store hosted by the backend services;
   automatically downloading and installing the removed code, by the licensing server, in an application container associated with the computer application in response to the predetermined functionality associated with the computer application being re-enabled and a determination that the active license is available;
   automatically release, by a mobile device, the active license to be available in response to a predetermined period of inactivity for the active license;
   determining, by the mobile device, whether the licensing sever is able to communicate with the computer application;
   in response to a determination that the computer application is unable to communicate with the licensing server-using a cached local policy, determining, by the mobile device, what a last known license is and how long the last known license can operate on;
   notifying, by the licensing server, a developer that the last known license is about to expire; and
   canceling, by the licensing server, the services in response to the last known license not being renewed after a predetermined time after notifying the developer, wherein enforcing in the escalating manner is performed within the computer application, after expiration of the license, without a need to further access the licensing server following the expiration of the license, wherein the licensing enforcement policies are configured to allow the user of the computer application to log into the licensing server to renew a license to use the computer application after the licensing server has disabled the services and functionality associated with the computer application, wherein enforcing the license enforcement policies automatically begins at login of the computer application to the licensing server before receiving backend authentication of the backend services, and wherein the licensing server comprises a pointer to an application store for supporting mandatory application updates.

2. The method of claim 1, wherein the determining compliance with the licensing file comprises monitoring, by the licensing server, the computer application.

3. The method of claim 2, wherein the monitoring determines whether a license of a developer of the computer application remains valid.

4. The method of claim 3, wherein the licensing file is in a shell of the computer application.

5. The method of claim 4, wherein the licensing file includes a license ID which is associated with developer information of the computer application.

6. The method of claim 2, wherein the licensing file comprises a URL for the licensing server, such that the computer application always connects to the licensing server in order to determine whether the licensing enforcement policies of the licensing file should be initiated regardless of backend services.

7. The method of claim 1, wherein the licensing file is deployed with the computer application.

8. The method of claim 1, wherein the calls to determine whether usage of the computer application complies with the licensing enforcement policies are received by the licensing server as background threads, apart from requested services originating from the computer application, to avoid creating latency issues regarding the requested services due to the calls.

9. The method of claim 1, wherein the licensing file is further encrypted.

10. The method of claim 1, wherein the licensing file is hardcoded with an expiration time that matches an expiration of the services provided by backend services.

11. The method of claim 1, wherein the enforcing is performed in the escalating manner over a predetermined time period after the initial notification.

12. The method of claim 1, wherein: the enforcing is performed in the escalating manner following either a predetermined time period after the initial notification or following a predetermined number of operational sessions of the computer application after initial notification; the services and functionality associated with the computer application are updated by a licensing tool in the licensing server; the license enforcement policies include establishing how many times the computer application can launch without communicating with the licensing server to determine compliance with the license enforcement policies; the enforcing of the license enforcement policies is performed in a background of performing services associated with the computer application; the enforcing of the license enforcement policies includes the computer application enforcing a concurrent or active usage license constraint where the computer application calls the licensing server to determine if it is licensed; the licensing server checks to determine if a number of active users exceeds a threshold, and, if the number of active users exceeds the threshold; and the licensing server informs the computer application that all of the current active licenses are full and limits performance of features of the license by the computer application.

13. The method of claim 1, wherein the services and functionality associated with the computer application are updated by a licensing tool in the licensing server.

14. The method of claim 1, wherein the license enforcement policies include establishing how many times the computer application can launch without communicating with the licensing server to determine compliance with the license enforcement policies.

15. The method of claim 1, wherein the enforcing of the license enforcement policies is performed in a background of performing services associated with the computer application.

16. The method of claim 1, wherein the enforcing of the license enforcement policies includes the computer application enforcing a concurrent or active usage license constraint where the computer application calls the licensing server to determine if it is licensed, and wherein the licensing server checks to determine if a number of active users exceeds a threshold, and, if the number of active users exceeds the threshold, the licensing server informs the computer application that all of the current active licenses are full and limits performance of features of the license by the computer application.

17. The method of claim 16, wherein a background thread between the computer application and the licensing server continuously polls users and notifies the computer application when an active license is available and automatically upgrades the computer application to full performance.

18. The method of claim 1, wherein enforcing the license enforcement policies includes a plurality of levels of response, and the plurality of levels of response include a simple notification while continuing to use the services, a degradation of the services, complete disabling of the services, and providing log in services.

19. The method of claim 18, further comprising locking out the services in response to the license expiring.

* * * * *